INVENTOR
JOHN R. LeBLANC

United States Patent Office 3,682,762
Patented Aug. 8, 1972

---

3,682,762
RIGID-WHEN-WET BOXBOARD
John R. Le Blanc, Wilbraham, Mass., assignor to Alton Box Board Company, Alton, Ill., and Monsanto Company, St. Louis, Mo.
Filed Feb. 25, 1971, Ser. No. 119,008
Int. Cl. B32b 3/28, 9/06, 29/06
U.S. Cl. 161—133    7 Claims

ABSTRACT OF THE DISCLOSURE

Corrugated fiberboard having at least one sheet of the board structure impregnated with a mixture of a modified resole type phenolic resin and a polyaminoalkyl-substituted organosiloxane copolymer, and procedure for making.

BACKGROUND

Figure 1:
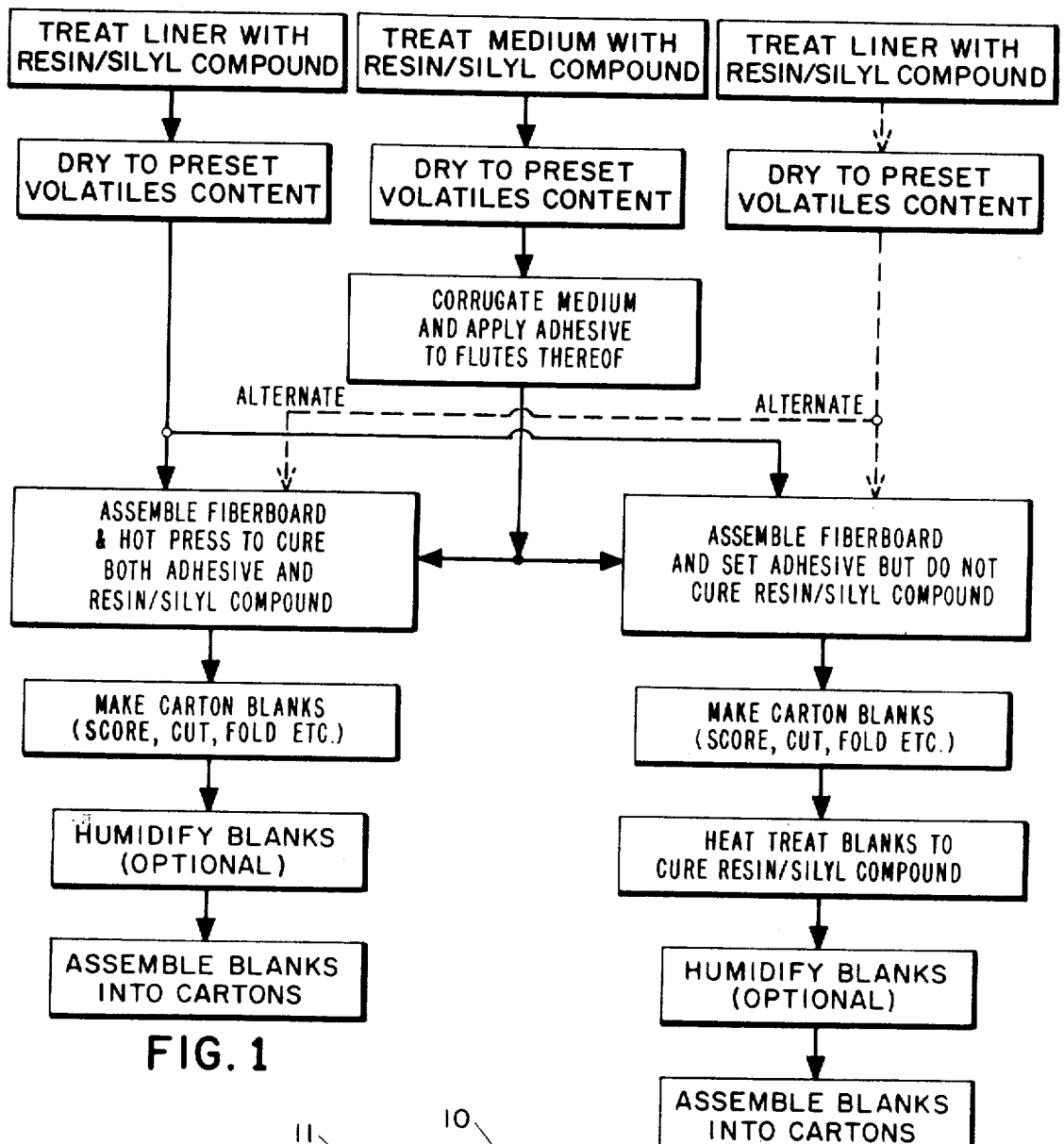

Cartons formed from conventional corrugated paper board have generally not been acceptable as containers in applications where moisture is present, such as cartons for the transport of foodstuffs like fresh produce (vegetables, meat, poultry). This is because such cartons tend to absorb moisture and then lose strength and crush resistance. For use in high moisture environment applications, more expensive containers of wood, metal, or plastic have thus heretofore been required for such applications.

It has now been discovered that corrugated paperboard having a surprising combination of moisture repellancy and rigid-when-wet properties are produced by treating (preferably impregnating) at least one of the sheet members (either medium or liner, or both) employed in the corrugated paperboard with an aqueous solution of a mixture of resole phenolic resin and polyaminoalkyl-substituted organo-siloxane before such sheet member is fabricated into corrugated fiberboard, Cartons made from such a product corrugated fiberboard display surprisingly high strength and crush resistance properties even after periods of relatively prolonged moisture exposure.

SUMMARY

The present invention is directed to a corrugated fiberboard construction comprising at least one corrugated medium sheet member and at least one liner sheet member. Each corrugated medium sheet member is positioned adjacent a liner sheet member and is bonded thereto by an adhesive at positions of mutual contact therebetween.

In such construction, either the medium sheet member or the liner sheet member, or both (preferably, for greatest effect) are each treated (i.e. impregnated or coated) with from about 2 to 20 weight percent based on total sheet weight (from about 4 to 11 weight percent, same basis, being preferred), of composition comprising a modified resole phenolic resin system and a polyaminoalkyl-substituted organosiloxane copolymer where, in such composition, the weight ratio of such resole phenolic resin to such organosiloxane copolymer ranges from about 25 to 99 (weight ratios of from about 49 to 99 being preferred).

The adhesive used in such construction can be any conventional water resistant adhesive known to the art. By the term "water resistant adhesive" reference is had to an adhesive which provides adequate adhesion (such as at least about 15 lbs./4 sq. in. adhesion) after a 24-hour water soak, according to TAPPI Test RC–269). Examples of such adhesives include resorcinol-starch-formaldehyde, phenol-starch-formaldehyde, polyvinyl alcohol-starch adhesives, urea-starch-formaldethyde adhesives, and the like.

The corrugated paperboard products of this invention are characterized, as indicated above by excellent strength and crush-resistance, which may, for present purposes, be conveniently determined using a flat crush resistance test before and after moisture exposure by means of ASTM Test Procedure No. D–1225–54.

As indicated, a corrugated fiberboard construction of this invention employs a sheet-like medium and a sheet-like liner. Each medium is corrugated and positioned adjacent to a liner member on one side thereof (preferably there is a liner on each side of a corrugated medium). Each liner is bonded to its adjoining medium at positions of mutual contact therebetween with an adhesive which is interposed between such a liner sheet member and such a medium sheet member at such positions of mutual contact (typically the tips of the corrugated medium flutes).

For use as the medium, one can use a paperboard ranging in thickness from about 7 to 15 thousandths of an inch and having a grade weight of from about 25 to 36 pounds per 1000 sq. ft.

For use as the liner, one can use a paperboard ranging in thickness from about 5 to 20 thousandths of an inch and having a grade weight of from about 33 to 120 pounds per 1000 sq. ft.

A medium or liner member after being treated with a composition of modified resole phenolic resin and polyaminoalkyl-substituted organosilane copolymer is dried (typically in air) so as to produce a product treated sheet having a total volatiles content of from about 5 to 10 weight percent. The terms "treated," "treating," "treatment," or equivalent word forms, as used herein are generic to both impregnation and coating of such a substrate paper. Treatment can be accomplished in any convenient, conventional manner, as hereinafter further detailed and illustrated. Preferably, in any given corrugated fiberboard construction made by the present invention, a medium member is always so treated with such modified phenol-aldehyde resin system, while a liner member need not be so treated (but preferably is), but any convenient combination of treated sheet members may be used, depending on circumstances.

A corrugated fiberboard construction of this invention thus employs at least one medium member and at least one liner member wherein at least one of the media and liners is treated with the herein described treating composition. Each medium is corrugated and positioned adjacent each liner on one side thereof (preferably a construction has a liner in each side of a corrugated medium).

DRAWINGS

Figure 2:
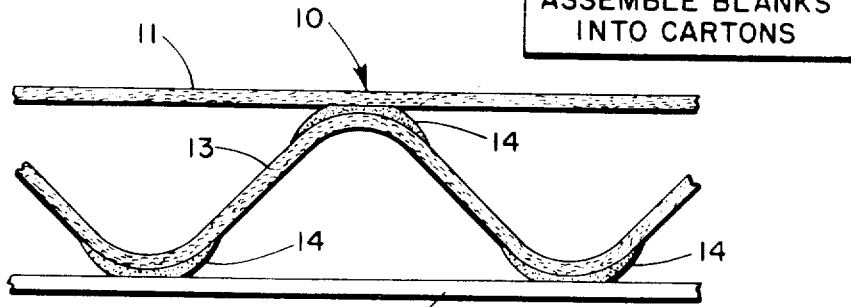

The present invention is better understood by reference to the attached drawings wherein:

FIG. 1 is a simplified flow sheet illustrating one manufacturing process for making box blanks in accordance with the teachings of this invention; and FIG. 2 is a diagrammatic perspective view of a sample of a scored, thermoset corrugated fiberboard produced in accordance with the teachings of the present invention.

Turning to FIG. 1, there is seen in block form a flow sheet for a carton blank manufacturing procedure which incorporates the teachings of this invention. Since this flow sheet is believed to be largely self-explanatory, particularly in view of the present written specification, no detailed description thereof is given here. Observe that conventional corrugated fiberboard manufacturing procedures can be employed to fabricate carton blanks from medium and/or liner members pretreated in accord with the teachings of this invention.

In FIG. 2, there is seen a corrugated fiberboard construction such as produced by the process of FIG. 1 which construction is herein designated in its entirety by the numeral 10. Construction 10 incorporates a pair of liner members 11 and 12 having interposed therebetween a corrugated medium member 13, member 13 being bonded to members 11 and 12 by adhesive 14 applied to flute tips of medium member 13. Medium member 13, liner member 11, and/or liner member 12 are treated with a composition of modified phenolic resin and polyaminoalkyl-substituted organosiloxane copolymer, as taught herein. The improved moisture/water resistance of such a construction 10 may be demonstrated by flat crush data or, more preferably, by top/bottom compression data.

DETAILED DESCRIPTION

As those skilled in the art will appreciate, in the art of corrugated fiberboard, it has been conventional to employ as the medium sheet member either Kraft paper or jute paper. A corrugated medium member is formed by running a continuous sheet of medium through corrugating rolls. The medium or "9 point" as it may sometimes be called, takes on a wave-like shape as it passes between the corrugating rolls which mesh similar to gear teeth except that they are especially shaped to provide contours deemed best by a particular manufacturer for corrugations.

While the corrugating medium may be any of the cellulosic fibrous sheet materials conventionally used in the art, it is usually a sheet of about 26 pounds per 1000 sq. ft. having a thickness of about 0.009 inch for all grades of combined board, but for purposes of the present invention, may be heavier or lighter for special requirements. Corrugating medium, for example, is most commonly made from "semi-chemical" pulp but is also made from straw, craft, bogus, or chip (mixed, repulped fibers).

There are four conventional or standard sizes of corrugations as follows:

TABLE

| Designation: | Number of flutes per foot (approximate) | Thickness of single wall board [1], in. |
|---|---|---|
| A | 33–39 | 0.185–0.210 |
| B | 47–53 | 0.097–0.105 |
| C | 39–45 | 0.139–0.145 |
| D | 90–97 | 0.045–0.0624 |

[1] Approximate, depending on thickness of facings and also the particular corrugating rolls.

As with medium sheet members, any conventional liner sheet member can be used in the manufacture of the corrugated fiberboard of the present invention. Generally, the liner sheet members are made from sulfate kraft, but sometimes are made from other pulps.

Kraft for liner sheet members is usually made on a Fourdrinier machine although some is made on a cylinder machine. Commonly, liner sheet members are made to standard weights which are 26, 33, 38, 42, 47, 62, 69, and 90 pounds per 1000 sq. ft. with thicknesses for liner sheet members ranging from 0.009" to 0.025".

Details on the characteristics of medium sheet members and liner sheet members are well known to the corrugated fiberboard manufacturing industry. See, for example, Uniform Freight Classification Rule 41. The corrugation flutes can be combined using adhesive with a facing or liner sheet member on one side only, called a single face board; when facings are on both sides of the corrugated medium sheet member, the product is sometimes called single wall board or double face board. If there are two sheets of flutes with a facing on each side and one in the middle, the product is sometimes called double wall board. If there are three layers of flutes with two outer liner facings and two inner liner facings between media layers, the product is sometimes called triple wall board.

The modified phenol-aldehyde resin system used in this invention comprises:

(A) from about 80 to 94 weight percent (based on total modified phenol-aldehyde resin system dry weight basis) of a phenol-formaldehyde resole resin, (B) From about 1 to 5 weight percent (same basis) of at least one inorganic ammonium salt having a pH of from about 0.8 to 6.5 when in a 5 weight percent aqueous solution, such as, for example, ammonium chloride (preferred), and other ammonium halides, ammonium sulfate, ammonium phosphate (including acid salts thereof), ammonium nitrate, and the like, (C) The remainder up to 100 weight percent (same basis) of any given such system of urea. This resin system has a pH in the range of from about 0.8 to 6 (preferably about 1 to 4) when in the form of an aqueous solution of about 35 weight percent total resin system solids.

The phenol-formaldehyde resole resin used in this resin system is itself characterized by having:

(A) A water solubility such that about a 55 weight percent aqueous solution of resole resin solids can be prepared, (B) A combined average number of mols of formaldehyde per phenol ring of from about 1.0 to 2.9 (preferably from about 1.1 to 2.0), (C) A pH of from about 7 to 9.2 when in the form of an aqueous solution of about 35 weight percent total resin solids, and (D) An ash content of less than about 2.5 weight percent (based on about a 35 weight percent solution of total resin solids).

The adhesive used most preferably comprises a resorcinol-starch-formaldehyde adhesive system which is characterized by:

(A) Having a total resorcinol to total starch weight ratio (based on total adhesive system solids) of from about 1 to 7, (B) Containing at least about 1 weight percent (based on total adhesive system solids) of combined formaldehyde, and (C) Containing at least about 70 weight percent of starch (based on total adhesive systems solids).

The modified phenol-aldehyde resin system itself can be made by any conventional procedure known to the art of phenolic resins. For example, one convenient and preferred procedure involves condensing usually at temperatures ranging from about 50 to 80° C. phenol and formaldehyde in the above-indicated desired mol ratio under aqueous liquid phase conditions in the presence of a basic catalyst, such as an alkali metal hydroxide (e.g. sodium hydroxide) or an alkaline earth hydroxide (e.g. calcium hydroxide), a trialkyl amine (e.g. triethylamine) or the like, until a desired end point is reached, such as, for example, a free formaldehyde content which is preferably less than about 3 to 10 weight percent.

The product is a phenol-formaldehyde resole resin in aqueous solution having a total solids content of from about 30 to 70 weight percent. Usually and preferably, the resin solution is prepared as a concentrate of from about 40 to 55 weight percent solids (based on the total solution weight) which may be conveniently and preferably diluted down before use to a solids content of from about 5–50 weight percent. Preferably, the solids content of the concentrate ranges from about 45–60 weight percent and preferably the solids content of the diluted working solution ranges from about 15–45 weight percent.

For use in the products of this invention, it has been found that this resole resin should preferably not be advanced in manufacture beyond the point where it has a water solubility such that about a 55 weight percent solids in aqueous solution thereof can be prepared (preferably about 30 weight percent). Also, it has been found that this resole resin should preferably have a methylol content per aromatic ring of from about 0.5 to 3 (preferably from about 1 to 2.5) as determined, for example, by NMR measurements.

If such resin is more advanced (i.e. has a high molecular weight) than such a solubility as above indicated, or if such resin has a different methylol content than that above indicated, then it appears to have less paper treating characteristics, especially at the high application speeds conventionally employed for paper transport in the manufacture of corrugated fiberboard for purposes of practicing the present invention.

In addition, it has been found that this resole resin before addition of urea and inorganic ammonium salt thereto should preferably have a pH of from about 5.6 to 9.2 when in the form of an aqueous solution of about 35 weight percent total resin solids (preferably from about 7 to 8.5). Also, it has been found that this resole resin should preferably have an ash content of less than about 2.5 weight percent based on about a 35 weight percent aqueous solution of total resin solids (preferably less than about 0.7).

One convenient way in which to measure the ash content for present purposes is to take two grams of such an aqueous solution (35 percent solids) and deposite same in a crucible. The crucible is then heated to about 150° C. for about 2 hours to substantially completely crosslink the resin and evaporate free water and thereafter the crucible is exposed to about 1000° F. for about 24 hours. Afterwards, the crucible is cooled to room temperature and measured to determine an increase in weight over starting empty weight thereby giving the ash content of the resin.

If such resin has a lower or higher pH, or a higher solids content, than those respectively above indicated, then it appears to have undesirable effects upon product paper treated therewith, especially in the properties of corrugated fiberboard made therefrom, for purposes of making the improved products of this invention.

In making the modified phenol-aldehyde resin systems for use in this invention, it is generally convenient and preferred to add both the ammonium salt and the urea in the respective amounts above indicated, each in the form of a finely divided powder, or even (preferably) already dissolved in water, to the diluted or partially diluted phenol-formaldehyde resole resin (just described). Such addition typically causes this pH of this product system to fall in the range from 0.8 to 6, as above described.

Sometimes, in order to make the pH of the product phenol-aldehyde resin system low, yet within the indicated range, one may, if desired, add to a given resole resin solution, preferably one diluted for use and having the ammonium salt and urea already dissolved therewith, amounts of a strong inorganic acid, such as hydrochloric, or the like, until the pH is lowered to some desired value in the range indicated; however, such an acid addition is generally not necessary owing to the presence of the ammonium salt which itself tends to produce a pH within the ranges indicated.

The ammonium salt and the urea are conveniently not added to a resole resin solution until shortly before a medium of liner sheet member is to be treated with a resin system. The organosiloxane copolymers used in the present invention are the reaction product of:

(A) At least one compound selected from the group consisting of:
  (1) silanes of the formula:

(1) $R''_x(Z_nR')Si(OR)_{3-x}$ where:

$x$ is an integer of from 0 to 2 inclusive, each R is an alkyl radical of less than 4 carbon atoms, R' is an aliphatic hydrocarbon radical containing a number of carbon atoms selected from the group consisting of 1, 3, 4 and 5 carbon atoms and having a valence of $n+1$, where $n$ is an integer of from 1 to 3 inclusive, Z is a monovalent radical attached to R' by a carbon-nitrogen bond and is composed of carbon, nitrogen and hydrogen atoms, and contains at least 2 amine groups in which the nitrogen atoms are attached only to substituents selected from the group consisting of hydrogen, and aliphatic hydrocarbon, cycloaliphatic hydrocarbon and aromatic hydrocarbon radicals, the nitrogen in Z being present only in said amine groups, the ratio of carbon atoms to nitrogen atoms in the substituent —$R'Z_n$ being less than 6:1, and each R" is a monovalent hydrocarbon radical free of aliphatic unsaturation, and (2) partial hydrolyzates formed by mixing (1) with up to 60 percent of its theoretical equivalent of water, with (B) at least one organosiloxane of the average general formula:

(2) $$R'''_y Si(OH)_m O_{\frac{4-m-y}{2}}$$

where each

R''' is selected from the group consisting of monovalent hydrocarbon radicals and halogenated monovalent hydrocarbon radicals, $m$ has a positive average value up to and including 2, $y$ has an average value of from 1 to 2.5 inclusive, and the sum of $y+m$ has an average value up to and including 3, the value of $m$ being such that the organosiloxane (B) contains at least 1.0 percent by weight of hydroxyl groups, by contacting (A) and (B) in liquid phase.

Such copolymers and their preparation are described, for example, in U.S. Pat. 3,355,424 and U.S. Pat. 3,460,981.

Aqueous solutions of resole, siloxane copolymer, urea, and inorganic ammonium salt have adequate storage stability, for example, typically such solutions can be stored for periods of about 5 hours and sometimes more at temperatures of 0 to 30 percent.

A particularly preferred such siloxane is a polysiloxane prepared according to the teachings of Example 1 of U.S. Pat. No. 3,355,424.

Such siloxane copolymers generally are water dispersible or water soluble to the extent that they form a stable aqueous solution or dispersion together. Characteristically, when such a siloxane copolymer and such a modified resole resin system are used together to treat a cellulosic substrate and after such treated substrate is exposed to a temperature of about 150° C. to effect thermosetting of the mixture in and on such substrate, the resulting cured mixture gives less than 2 percent total extractables with acetone from the treated paper (based on total treating mixtures weight).

The medium and liner can be treated with a resin system and organosiloxane copolymer composition by immersion or any other convenient coating techniques, as indicated above. For example, in liner treatment, a preferred method involves surface coating rather than immersion impregnation. Suitable coating procedures involve resin application to one surface of a liner sheet, as with a brush, doctor blade, or other application mechanism. Such a procedure is particularly applicable when only one side of a liner is to be treated with a resin system because a coating procedure produces a differential impregnation or coating of the liner. Thus, the resin density is then greater relative to one surface of the resulting liner sheet than relative to the other (opposed) surface thereof. In general, it is preferred to uniformly coat both liner and medium sheet members with a resin system.

After treatment, a medium or liner sheet member is dried by passing such over or through a hot zone so that excess moisture is removed and the total volatiles content of the so-dried sheet ranges from about 5 to 10 weight percent. Typical drying conditions without any significant curing usually involve temperatures of from about 150 to 220° F. applied, inversely, for times of from about 0.01 to 1 minute, though longer or shorter times and temperatures can be employed without departing from the teachings of this invention. Those skilled in the art will appreciate that, in drying, the resin is B-staged and free water is substantially completely removed without appreciable advancement or curing of the resin impregnated into the liner or medium sheet member. Thus, the percentage of volatiles in a treated liner or medium is controlled within the ranges above indicated. For example, if the percentage of volatiles is reduced below such range, the resin system tends to crosslink and subsequently during corrugated fiberboard production reduced adhesive bonding to such a resin crosslinked medium or liner sheet tends to result, among other undesired results. On the other hand, for example, if the percentage of volatiles is left appreciably above such range, reduced adhesive bonding can likewise result. Also, outside of these ranges, a treated medium may be difficult to corrugate.

Next, if not stored interveningly, a so-treated medium and liner member are combined with adhesive and, if used, untreated medium and/or liner members into corrugated fiberboard. Commercially, a conventional combining machine may be used for this operation.

The adhesive used in the combining operation is as characterized above. Typically, as in a plant manufacturing operation, an adhesive used to make a starting corrugated fiberboard used in this invention, at the time of its application to a medium, is in the form of an aqueous system whose viscosity ranges from about 200 to 8000 cps. (preferably 300 to 5000) and which has a total solids content of from about 15 to 30 weight percent. Usually, the adhesive system is in the form of a uniform heterogeneous aqueous dispersion in which some of the resin portion of the system is dissolved and some of the starch portion is dispersed. As in the case of the resin used to impregnate medium liner sheet members, such adhesive systems are conventional to the art and do not constitute a part of the present invention. In general, the adhesive used is prepared just prior to the time of use by a fiberboard manufacturer or it is prepared by a supplier to him. Commonly, a supplier provides the adhesive as a one tank or two tank formulation, which is combined in the case of two tanks, and which is typically further diluted with water before actual application. Although an adhesive is generally discontinuously but automatically applied only to the flutes of a corrugated treated medium when using machinery to make corrugated fiberboard of this invention, typical machine adhesive application rates range from about 3 to 12 pounds adhesive solids per 1000 sq. ft. of product corrugated fiberboard but more or less than this amount can be employed. Adhesive application rates are not critical and can be widely varied without departing from the spirit and scope of this invention.

After adhesive application, corrugated medium sheet member(s) and liner sheet member(s) are duly combined together, as in a so-called combining machine, into board, the resulting fiberboard construction is subjected to temperatures of from about 320 to 380° F. for times of from about 0.5 second to 15 seconds to bind medium and liner together but not thermoset the resin. Preferred temperatures for drying the combined corrugated medium sheet and liner sheet member(s) involve the use of temperatures of from about 320 to 370° F. applied for times of from about 0.5 to 5 seconds. Such preferred heating temperatures and times substantially completely dry the adhesive, but do not thermoset the resin, thus bonding together the medium and liner sheet members at positions of mutual contact therebetween, thereby to form a desired corrugated fiberboard.

Usually, and conventionally, a starting corrugated fiberboard is promptly made into carton blanks following manufacture, though it is possible and convenient to store the corrugated fiberboard before same is scored. In general, scoring, and methods for scoring corrugated fiberboard, constitutes well known technology to those of ordinary skill in the art and does not form part of this invention.

When, for example, a starting corrugated fiberboard is directly converted into box blanks, it is conventional to place at the end of a combining machine knives which cut the corrugated fiberboard into the lengths required by the particular box to be made. Next, the resulting piece of board is scored longitudinally, so as to permit folding such board to make the top and bottom flaps of a box. In this operation, the sheet of fiberboard product is also longitudinally edge trimmed to an exact predetermined width. In some modern machines, during the operation of scoring longitudinally, the longitudinal edge trimming is performed before the corrugated fiberboard continuous sheet is cut to length for individual box blanks. The next carton blank manufacturing operation usually accomplishes three functions: The sheet is trimmed transversely to a desired length, three slots with connecting score lines are cut on both sides of the sheet to form the individual top and bottom flaps, and any desired printing is applied to the surface (usually exteriorly). Finally, in a fourth manufacturing operation, the product box blank is folded so that the two ends come together and are then joined by taping, gluing, or stapling. This flattened "tube" can then be opened up into box form, the bottom flaps folded closed and sealed, the contents placed inside, and the top flaps folded and sealed.

Following such a fabrication operation, a carton blank, if the treating resin/siloxane copolymer composition has not previously been exposed to thermosetting temperatures, is subjected to temperatures of from about 320° F. to 450° F. for, inversely, times of from about 0.5 second to 10 minutes whereby the modified phenol-aldehyde resin system (and the silyl material, if present) is completely thermoset. For example, a corrugated fiberboard prepared by scoring, cutting, slotting, etc. is subjected to a final blank heat processing step using conditions as just described.

EMBODIMENTS

The following examples are presented in illustration of this invention and are not intended as limitations thereof. Where "parts" are mentioned, parts by weight are intended unless otherwise indicated.

Example A

Part A.—To a reaction vessel fitted with an agitator, heater and condenser for refluxing, under vacuum conditions, add 100 parts of phenol, 200 parts of 50 percent Formalin and 3.5 parts of calcium hydroxide to provide a pH of about 8.0–9.0. The reaction is carried out at a temperature of about 60–62° C. for about three hours. The product is then cooled to about 30° C. and the pH is adjusted to 6.0–7.0 with hydrochloric acid. The resin is then cooled to room temperature. The reaction product is found to be infinitely water dilutable in that 24 or more volumes of water can be mixed with one volume of the resin at a temperature of 24–26° C. without causing the mixture to exhibit haziness or milkiness.

Part B.—Aqueous solutions of resole modifiers and siloxane copolymer are prepared, allowed to statnd one month at 5° C. and then observed for stability. The particular modifiers and siloxane copolymers are listed in Table I below:

TABLE I

| Example treating solution | Catalyst | Parts | Materials | Parts | Water, parts | Stability |
|---|---|---|---|---|---|---|
| (1) | Ammonium chloride | 16 | Polysiloxane | 10 | 40 | OK. |
|  | Urea | 44 |  |  |  |  |
| (2) | Ammonium sulfate | 10 | ----do---------- | 8 | 42 | OK. |
|  | Urea | 40 |  |  |  |  |
| (3) | Ammonium chloride | 12 | ----do---------- | 12 | 44 | OK. |
|  | Urea | 42 |  |  |  |  |

The polysiloxane used is prepared as described in Example 1 of U.S. Pat. 3,355,424 (see column 8, lines 58 through 66).

Protective colloidals, such as polyvinyl alcohols, can be employed in small quantities, i.e. 0.5 to 5 parts, with the resin catalyst-water-repellent material admixture to further enhance the stability thereof.

Example B

An adhesive system of the resorcinol-starch-formaldehyde type, herein designated adhesive (4) is prepared as follows:

To 125 gallons of water is added 142 pounds of a commercially available resorcinol-starch mixture (from Penick and Ford under the trade designation Douglas Waterproof Corrugating Adhesive #7) and 150 pounds of corn starch. The resulting mixture is heated to from about 140 to 145° F. for 10 minutes at which time there is added thereto additionally 10 gallons of water and 20 pounds of caustic (sodium hydroxide). This last mixture is agitated for an additional 10 minutes thereafter at an elevated temperature of about 140° F. Finally, to the resulting mixture is added an additional 80 gallons of water. The product constitutes what can be termed the primary mixture, or carrier portion, of the adhesive system.

Next is prepared the secondary mixture or raw starch portion, as follows: To 250 gallons water is added 1000 pounds of corn starch and 68 pounds of 37 percent aqueous formaldehyde. The composition is mixed at room temperature.

Finally, the primary mixture and the secondary mixture are admixed together and stirred for about 1 hour. The product is an adhesive system ready for use. This adhesive system has a total resorcinol to total starch weight ratio (based on total adhesive system solids) of from about 1 to 7, and it contains about 1.0 weight percent (based on total adhesive system solids) of combined formaldehyde, as well as about 70 weight percent (based on total adhesive system solids) of starch. It has total adhesive solids content of about 25 weight percent, a viscosity of about 1000 centipoises and a gel point of about 150° F. determined by heating the adhesive in a water bath heated gradually to the gel temperature.

Another adhesive system, this one of the phenol-formaldehyde-starch type, herein designated adhesive (5) is prepared as follows:

To 16 weight parts of water is added 5 parts of the phenol-formaldehyde resin prepared in Example A, 2.1 parts of a 23 percent caustic (sodium hydroxide) solution, and 4.4 parts of corn starch. The resulting mixture is heated to 155–165° F. with continuous mixing and mixed an additional 10-20 minutes at 155–165° F. Finally, 13 parts of cooling water is added to the mixture. This product constitutes what can be termed the primary mixture, or carrier portion, of the adhesive system.

Next is prepared the secondary mixture or raw starch portion, as follows: To 41 parts water is added 18 parts corn starch. The composition is mixed at room temperature.

Finally, the primary mixture and the secondary mixture are admixed together and stirred for about one hour. The product is an adhesive system ready for use. The adhesive system has a total phenolic resin to total starch weight ratio (based on total adhesive system solids) of from about 1 to 8.6. It has a total adhesive solids content of about 25 percent, a viscosity of about 800 cps., and a gel point of about 148° F., as detemined by heating the adhesive in a water bath heated gradually to the gel temperature.

Still another adhesive system, this one of the urea-starch-formaldehyde type, herein designated adhesive (6) is prepared as follows:

234 pounds of carrier starch are heated at 180° F. in 84 gallons of water, cooled to 140° F. and 126 gallons of water added. 468 pounds of raw corn starch are then added and mixed to form a uniform dispersion. The pH is adjusted to 7–8 with sodium carbonate. When the temperature drops to about 90° F., 160 pounds of a water soluble-urea-formaldehyde resin, having a solids content of 65 percent, is added and mixed. Immediately prior to use the pH is adjusted to about 5.5 with an acid salt, e.g., ammonium chloride.

The product adhesive has a total solids content of about 32 weight percent (starch plus urea-formaldehyde resin) and it contains about 15 percent urea-formaldehyde resin solids on total starch.

Example I

A corrugated fiberboard of the present invention is prepared using the materials of Examples A and B as follows:

Each side of a 26 pound basis weight medium paper sheet about 0.009 inch thick are roller coated and dried by passing over a roll at 225° F. with modified phenol-aldehyde resin system of Example 1 to a total resin content of about 8 weight percent based on the dry weight of the sheet plus resin. One side of a 42 pound basis weight kraft liner paper sheet about 0.009 inch thick is roller coated and dried as above with the same resin system to a total resins content of 4 percent based on the dry weight of the sheet plus resin. The so-treated medium sheet and liner sheet are each dried to a total volatiles content of about 6 percent (as indicated by drying the paper to 160° C. for 10 minutes to determine weight loss).

Next, a medium sheet is corrugated into Type B flutes of about 50 per foot, and the resorcinol-formaldehyde-starch adhesive of Example 4 is applied to the tips of the flutes of the medium corrugations at the rate of about 4 pounds per 1000 ft.² of product fiberboard. The medium is then combined with two pieces of such liner sheet, one on each side of the adhesive treated medium sheet so as to form a corrugated fiberboard. This board is now exposed to a temperature of about 350° F. for about 2 seconds to dry and thermoset the adhesive. The product is an example of a starting corrugated fiberboard for use in this invention; Table II below summarizes:

Examples II–VI

Using the procedure of Example I, but employing different medium and liner members, treating resin systems, and adhesives, other corrugated fiberboards are prepared as summarized in Table II below:

TABLE II.—STARTING CORRUGATED FIBERBOARD

| Ex. No. | Medium Thickness, inches | Medium Grade weight lbs./10³ sq. ft. | Liner Thickness, inches | Liner Grade weight, lbs./10³ sq. ft. | Treating resin system System designation | Amount in medium Percent resin | Amount in medium Percent volatiles | Amount in liner Percent resin | Amount in liner Percent volatiles | Type flutes | Process board conditions Amount adhesive, lbs./10³ sq. ft. | Type | Adhesive application temp., ° F. | Time, sec. |
|---|---|---|---|---|---|---|---|---|---|---|---|---|---|---|
| I | .009 | 26 | .009 | 42 | 1 | 8 | 6 | 4 | 6 | B | 4 | 4 | 350 | 2 |
| II | .009 | 33 |  |  | 69 | 2 | 10 | 5–8 | 5 | 5–8 | C | 4 | 5 | 350 | 2 |
| III | .009 | 26 | .009 | 42 | 3 | 8 | 6 | 4 | 6 | B | 4 | 6 | 350 | 2 |
| IV | .009 | 26 | .009 | 42 | 1 | 8 | 6 | 4 | 6 | B | 4 | 6 | 350 | 2 |
| V | .009 | 25 | .015 | 61 | 3 | 12 | 8 | 3 | 5 | B | 4 | 5 | 340 | 3 |
| VI | .009 | 33 | .015 | 62 | 2 | 10 | 6 | 7 | 8 | B | 4 | 4 | 340 | 3 |

What is claimed is:

1. A corrugated fiberboard construction adapted to be rigid-when-wet comprising:
   (A) a corrugated medium sheet member ranging in thickness of from about 5 to 20 thousandths of an inch and having a grade weight of from about 25 to 120 pounds per 100 sq. ft.,
   (B) a liner sheet member ranging in thickness of from about 5 to 20 thousandths of an inch and having a grade weight of from about 25 to 120 pounds per 1000 sq ft.,
   (C) said corrugated medium sheet member, said liner sheet member, or both of said sheet member each containing from about 2 to 15 weight percent, based on total sheet weight of a composition comprising a modified resole phenolic resin system and a polyaminoalkyl - substituted organosiloxane copolymer wherein the weight ratio of such resole phenolic resin to such organosiloxane copolymer ranges from about 6.0 to 99.5,
   (D) said corrugated medium sheet member being positioned adjacent said liner sheet member and being bonded thereto at positions of mutual contact therebetween by an adhesive,
   (E) said adhesive having water resistance of at least about 15 lbs./4 sq. in. as indicated by pin adhesion after a 24 hour water soak,
   (F) said modified resole phenolic resin system comprising on a 100 weight percent total basis:
      (1) from about 80 to 94 weight percent resole resin,
      (2) from about 1 to 5 weight percent of at least one inorganic ammonium salt having a pH of from about 0.8 to 6.5 when in a 5 weight percent aqueous solution, and
      (3) the balance up to 100 weight percent of any given resin system being urea.

2. A corrugated fiberboard construction of claim 1 which has been subjected to temperatures of from about 320 to 450° F. for times of, inversely, from about 0.5 to 10 minutes.

3. The corrugated fiberboard construction of claim 1 wherein said medium sheet member has a thickness of from about 7 to 15 thousandths of an inch and a grade weight of from about 25 to 36 pounds per 1000 sq. ft.

4. The corrugated fiberboard construction of claim 1 wherein said liner sheet member has a thickness of from about 5 to 20 thousandths of an inch and having a grade weight of from about 33 to 120 pounds per 1000 sq. ft.

5. The corrugated fiberboard construction of claim 1 wherein said adhesive comprises a resorcinol-starch-formaldehyde system characterized by:
   (A) having a total resorcinol to total starch weight ratio based on total adhesive system solids of from about 1 to 7,
   (B) containing at least about 1 weight percent based on total adhesive system solids of combined formaldehyde, and
   (C) containing at least about 70 weight percent of starch based on total adhesive systems solids.

6. The fiberboard construction of claim 1 wherein said organosilyl compound is dimethylpolysiloxane.

7. A fiberboard construction of claim 1, wherein said organosilyl compound is the reaction product of:
   (1) At least one compound selected from the group consisting of
      (A) silanes of the formula

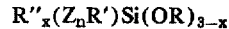

where:
      $x$ is an integer of from 0 to 2 inclusie, each R is an alkyl radical of less than 4 carbon atoms,
      R' is an aliphatic hydrocarbon radical containing a number of carbon atoms selected from the group consisting of 1, 3, 4 and 5 carbon atoms and having a valence of $n+1$, where $n$ is an integer of from 1 to 3 inclusive,
      Z is a monovalent radical attached to R' by a carbon-nitrogen bond and is composed of carbon, nitrogen and hydrogen atoms and contains at least 2 amine groups in which the nitrogen atoms are attached only to substituents selected from the group consisting of hydrogen, and aliphatic hydrocarbon, cycloaliphatic hydrocarbon, and aromatic hydrocarbon radicals, the nitrogen in Z being present only in said amine groups, the ratio of carbon atoms to nitrogen atoms in the substituent—$R'Z_n$ being less than 6:1, and each R'' is a monovalent hydrocarbon radical free of aliphatic unsaturation, and
      (B) partial hydrolyzates formed by mixing (A) with up to 60 percent of its theoretical equivalent of water, with
   (2) At least one organosiloxane of the average general formula

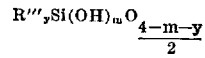

where each
   R''' is selected from the group consisting of monovalent hydrocarbon radicals and halogenated monovalent hydrocarbon radicals,
   $m$ has a positive average value up to and including 2,
   $y$ has an average value of from 1 to 2.5 inclusive, and the sum of
   $y+m$ has an average value up to and including 3, the value of $m$ being such that the organosiloxane (2) contains at least 1.0% by weight of hydroxyl groups, by contacting (1) and (2) in liquid phase.

References Cited
UNITED STATES PATENTS

| | | | |
|---|---|---|---|
| 3,431,162 | 3/1969 | Morris | 161—133 |
| 3,616,163 | 10/1971 | Reisman | 161—133 |
| 3,617,428 | 11/1971 | Carlson | 161—133 |
| 3,619,341 | 11/1971 | Elmer | 161—133 |
| 3,619,342 | 11/1971 | Burke | 161—133 |

WILLIAM A. POWELL, Primary Examiner

U.S. Cl. X.R.

117—155; 156—210; 161—137, 209, 263